(12) United States Patent
Johanson et al.

(10) Patent No.: US 7,695,009 B2
(45) Date of Patent: Apr. 13, 2010

(54) INFLATOR FOR AN AIR-BAG

(75) Inventors: Mats Johanson, Fristad (SE); Björn Svärd, Landvetter (SE); Peter Qvint, Vårgårda (SE)

(73) Assignee: Autoliv Development AB, Vargarda (SE)

( * ) Notice: Subject to any disclaimer, the term of this patent is extended or adjusted under 35 U.S.C. 154(b) by 74 days.

(21) Appl. No.: 11/794,936

(22) PCT Filed: Jan. 9, 2006

(86) PCT No.: PCT/SE2006/000018

§ 371 (c)(1),
(2), (4) Date: Nov. 9, 2007

(87) PCT Pub. No.: WO2006/075944

PCT Pub. Date: Jul. 20, 2006

(65) Prior Publication Data

US 2008/0054611 A1    Mar. 6, 2008

(30) Foreign Application Priority Data

Jan. 13, 2005 (GB) ............... 0500684.6
Feb. 10, 2005 (GB) ............... 0502793.3

(51) Int. Cl.
*B60R 21/26* (2006.01)
(52) U.S. Cl. ............... 280/737; 280/736; 280/741
(58) Field of Classification Search .......... 280/736, 280/737, 741
See application file for complete search history.

(56) References Cited

U.S. PATENT DOCUMENTS

| 3,744,816 | A | | 7/1973 | Yamaguchi et al. |
| 5,460,406 | A | * | 10/1995 | Faigle ............ 280/741 |
| 5,582,806 | A | | 12/1996 | Skanberg et al. |
| 5,690,357 | A | * | 11/1997 | Cuevas .......... 280/737 |
| 5,725,243 | A | * | 3/1998 | Skanberg ........ 280/737 |
| 5,820,161 | A | | 10/1998 | Svensson |
| 5,847,314 | A | | 12/1998 | Blumenthal et al. |
| 6,129,380 | A | | 10/2000 | Rink et al. |
| 6,206,420 | B1 | * | 3/2001 | Skanborg et al. ..... 280/737 |
| 6,231,079 | B1 | * | 5/2001 | Perotto et al. ....... 280/737 |
| 6,254,129 | B1 | | 7/2001 | Rink et al. |

FOREIGN PATENT DOCUMENTS

| EP | 0856440 A2 | 8/1998 |
| GB | 2372310 A | 8/2002 |
| GB | 2416152 A | 1/2006 |
| GB | 2417066 A | 2/2006 |

* cited by examiner

*Primary Examiner*—Ruth Ilan
*Assistant Examiner*—Keith Frisby
(74) *Attorney, Agent, or Firm*—Harness, Dickey & Pierce, P.L.C.

(57) ABSTRACT

An inflator for an air-bag comprises a single gas bottle (1) containing the pressurised gas. The pressurised gas is a mixture including at least one oxidisable gas and at least one oxidising gas. The inflator incorporates a mechanism (20) to open the gas bottle to enable gas to flow from the gas bottle to the interior of an air-bag (13). There is an initiating device (30) within the air-bag in the form of a spark generator which generates a spark across electrodes (31) to ignite the mixture of gas from the gas bottle.

20 Claims, 5 Drawing Sheets

INFLATOR FOR AN AIR-BAG

CROSS-REFERENCE TO RELATED APPLICATIONS

Figure 1:
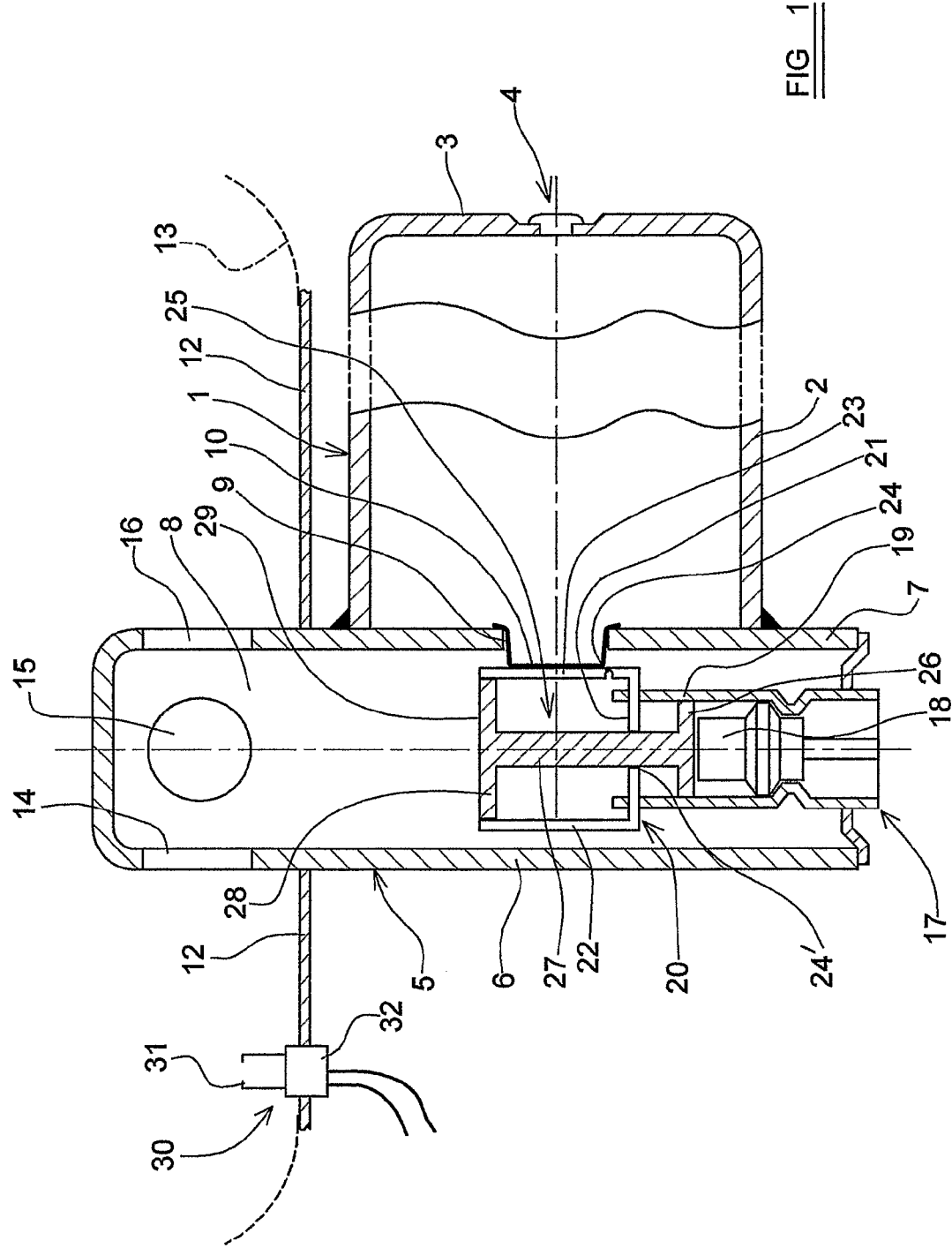

This application is a National Stage of International application No. PCT/SE2006/000018, filed Jan. 9, 2006. This application claims the benefit of GB 0500684.6, filed Jan. 13, 2005 and GB 0502793.3, filed Feb. 10, 2005 The disclosure(s) of the above applications are incorporated herein by reference.

THE PRESENT INVENTION relates to an inflator for an air-bag, such as an air-bag provided in a vehicle to provide protection for the occupant of the vehicle in the event that an accident should occur.

It has been proposed to provide air-bag inflators which incorporate two bottles or pressure vessels containing gas under pressure. Each bottle may be sealed by a metal foil. In one prior proposal the metal foil is initially supported by means of a support element which is held in position against the exterior of the foil. When the air-bag is to be inflated the support member is moved away from the metal foil, enabling the foil to rupture and thus permitting the gas to escape from the gas bottle and flow into the interior of the air-bag to inflate the air-bag.

In prior proposed inflators of this general type one gas bottle may contain a fuel, in the form of an oxidisable gas and the other bottle may contain an oxidising gas. The gases, when they escape from the gas bottles are mixed. Subsequently, when the gases are being introduced into the air-bag, the gases may be ignited to complete inflation of the air-bag.

WO96/110496 discloses an arrangement of this type. An activation signal from a crash sensor activates an opening mechanism to open the two gas bottles, and releases the stored gases through a gas flow conduit into an air-bag. An ignition device is provided, mounted in the gas conduit, adjacent an outlet of the gas conduit facing towards the air-bag, to ignite the mixed gas in the air-bag. This arrangement has been found to be relatively heavy and complicated.

EP-A-0,856,440 discloses a different arrangement in which an oxidisable gas and an oxidising gas are mixed and contained within a single pressure vessel. An initiator is present within the pressure vessel and, in an accident situation, the initiator is actuated to ignite the oxidisable gas. As the oxidisable gas burns it heats the remaining gas in the pressure vessel and increases the pressure of the gas in the pressure vessel, and the pressurised gas is directed into the air-bag to inflate the air-bag. The pressure vessel has to be sufficiently strong to withstand the pressure that is present within the pressure vessel during combustion of the oxidisable gas. It is to be appreciated that if a pyrotechnic initiator is utilised, the ignition reliability may be poor, due to variations in the weight and particle size of the pyrotechnic material used, which can lead to hot spot variation.

A further problem with the prior art is that if an inflator which has pressurised gas within a gas bottle is subjected to a very high temperature, for example if a vehicle in which the inflator is mounted should catch fire, there is a risk that the gas bottle may explode. Of course, this would be extremely disadvantageous to any person trapped within the vehicle, or any fire fighter fighting the fire.

The present invention seeks to provide an improved inflator.

According to this invention there is provided an inflator for an air-bag, the inflator comprising a single gas bottle containing a pressurised gas mixture, the pressurised gas mixture including at least an oxidisable gas and an oxidising gas, the inflator incorporating an arrangement to open the gas bottle to enable gas to flow from the gas bottle to the interior of an air-bag, there being an initiating device to ignite the gas from the gas bottle, the initiating device being arranged to ignite the gas when the gas is in the interior of the air-bag.

In embodiments of the invention, when the air-bag is inflated with the inflator, initially gas flows from the gas bottle to the interior of the air-bag, and when the gas is located within the interior of the air-bag the initiating device ignites the gas. The initiating device, therefore, can be located at a position remote from the bottle, which minimises the risk of an undesirable incident arising in the case of fire or caused by static electricity. Also, by igniting the gas mixture when the gas mixture is within the air-bag, as opposed to igniting the gas mixture as it emerges from the gas bottle, the risk of the gas mixture within the gas bottle becoming ignited is minimised.

In preferred embodiments of the invention the initiating device is actuated in response to a signal, there being a signal generator to generate the signal when gas from the gas bottle has flowed into the interior of the air-bag.

Thus it is to be appreciated that the initiating device is only actuated when the air-bag has been partially inflated by gas from the gas bottle.

Preferably the initiating device is a spark igniter.

Advantageously the initiating device is located within the air-bag.

In an alternative embodiment of the invention the initiating device is a pyrotechnic unit, mounted externally of the air-bag and a conduit to lead flame from the pyrotechnic unit to the interior of the air-bag.

The pyrotechnic unit may be a pyrotechnic unit supplied solely for the purpose of forming part of the initiating device. In such an embodiment the pyrotechnic unit may be mounted at any convenient point and, of course, the pyrotechnic unit may be actuated in response to a signal generated by a signal generator when gas from the gas bottle has flowed into the interior of the air-bag so that, once again, the air-bag will be partially inflated and then the gas within the air-bag will be ignited.

In an alternative arrangement the pyrotechnic unit forms part of the arrangement provided to open the gas bottle. The conduit leading flame from the pyrotechnic unit to the interior of the air-bag may be positioned so that the air-bag will have to be at least partially inflated with gas from the gas bottle before the flame from the pyrotechnic unit can ignite the flowing gas.

Advantageously the gas bottle is initially sealed by means of a rupturable foil and the opening arrangement is operative to cause rupturing of the foil.

In one embodiment the opening arrangement incorporates a support member mounted in position to support the foil in an un-ruptured state, the support member being retained in position by part of a piston element which, in an initial position, directly engages the support member, the piston element being associated with a squib to drive the piston element from the initial position to a release position in which the piston element no longer engages the support member, permitting the support member to move to a position in which the foil will rupture to permit gas to escape from the gas bottle.

Preferably the support member is formed as part of a bracket, in the form of a support arm which extends substantially perpendicularly from a base.

Conveniently the support member is yieldable and is configured to yield in response to the pressure of the gas in the bottle exceeding a predetermined threshold, thus permitting the foil to rupture.

Advantageously the support member has a line of mechanical weakness such that the line of mechanical weakness will break and at least part of the support member will yield when gas pressure in the gas bottle exceeds the predetermined threshold thus permitting the foil to rupture.

In an alternative embodiment the opening mechanism incorporates a piston, the piston being associated with a squib to drive the piston from an initial position to a second position, the piston having a shaft, the shaft initially being located adjacent the foil, with the piston being so positioned as the piston moves to the second position the foil will rupture.

Conveniently the gas mixture in the gas bottle includes, as an oxidisable gas, hydrogen, methane, propane butane or mixtures thereof.

Preferably the gas mixture in the gas bottle contains, as an oxidising gas, oxygen, or nitrogen dioxide.

Advantageously the gas mixture in the gas bottle contains air.

Conveniently the gas mixture in the gas bottle includes an inert gas.

Preferably the inert gas is helium, argon, nitrogen or mixtures thereof.

The invention also relates to an air-bag provided with an inflator to the type described above.

Figure 2:
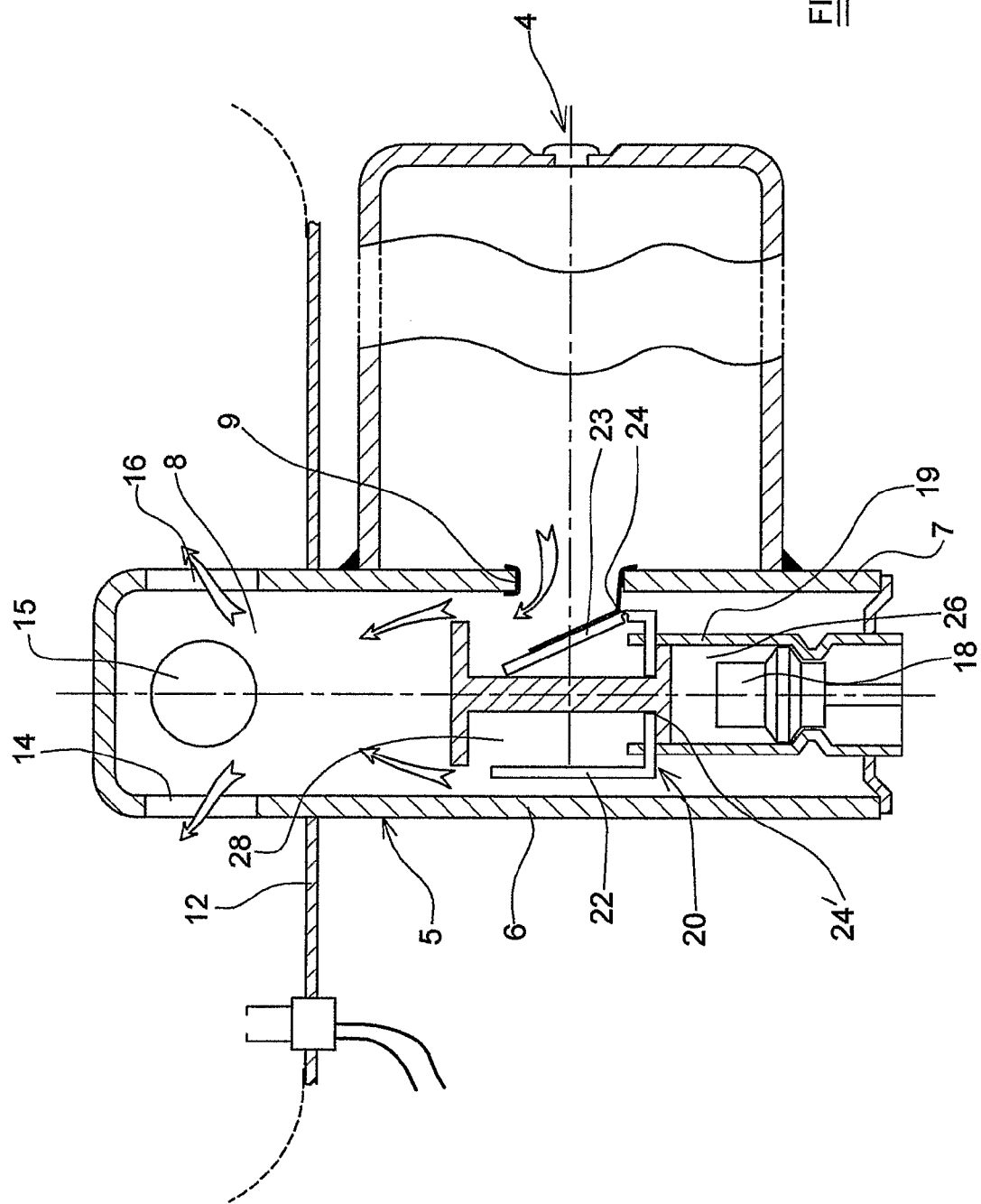
Figure 3:
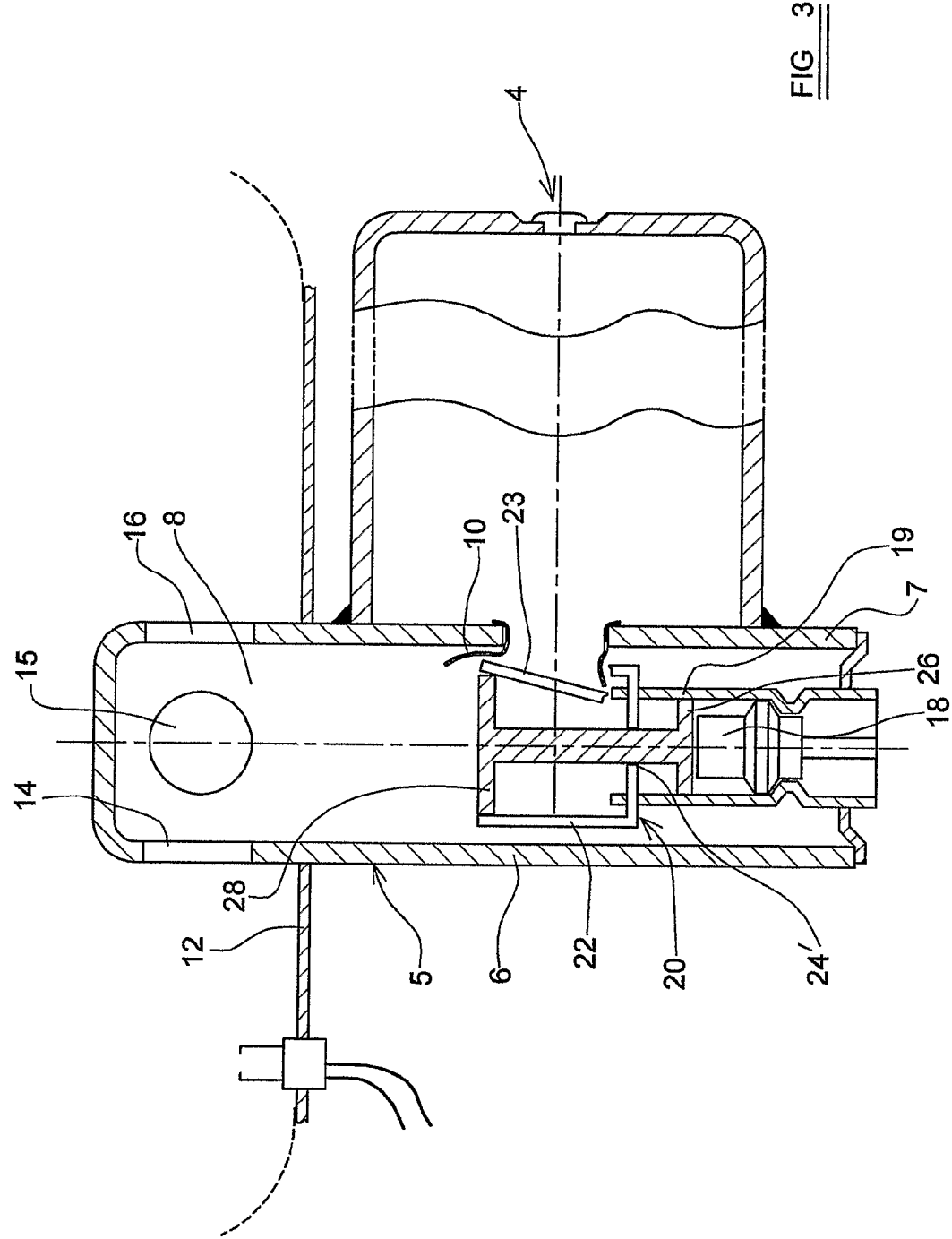
Figure 4:
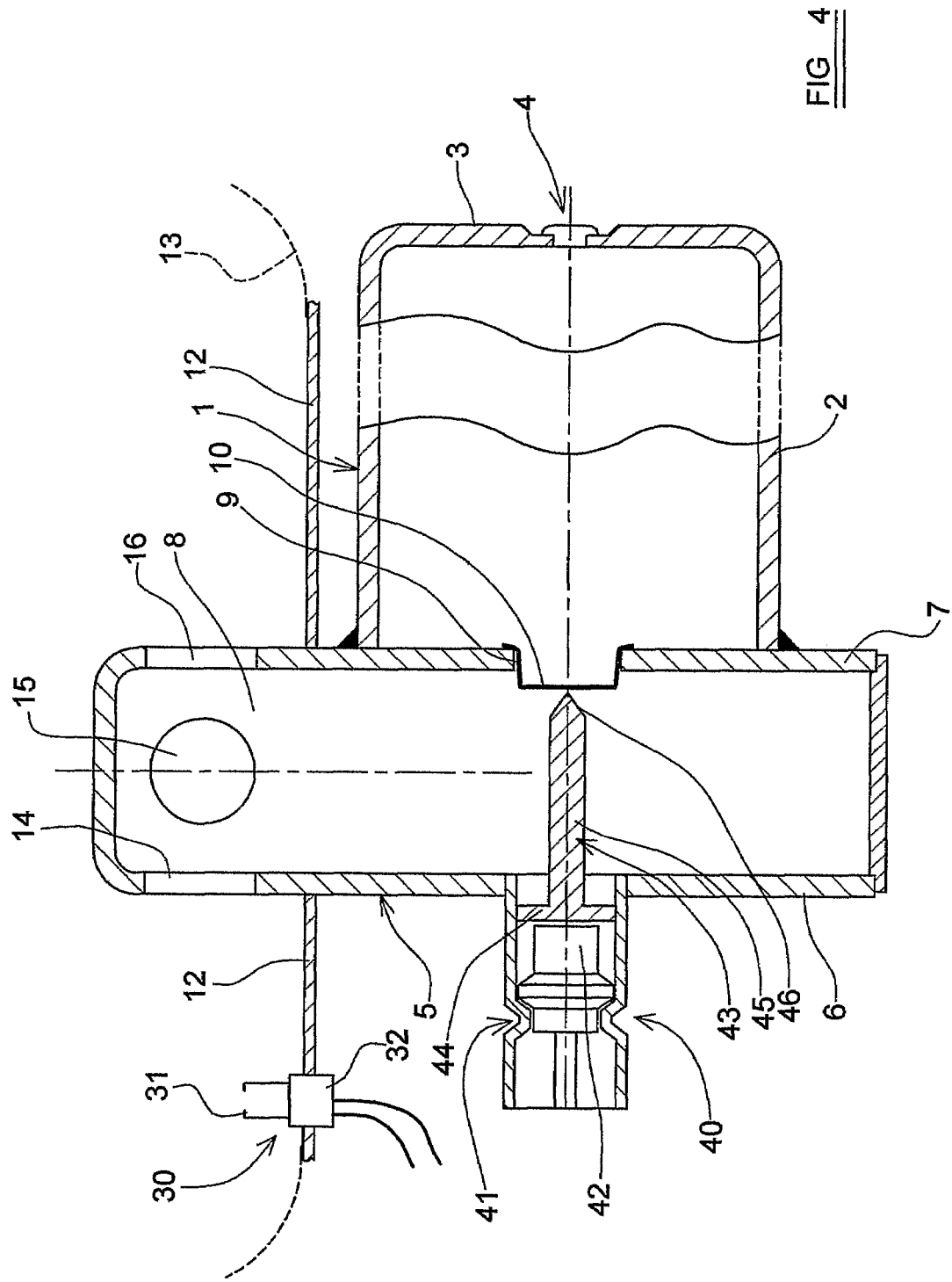
Figure 5:
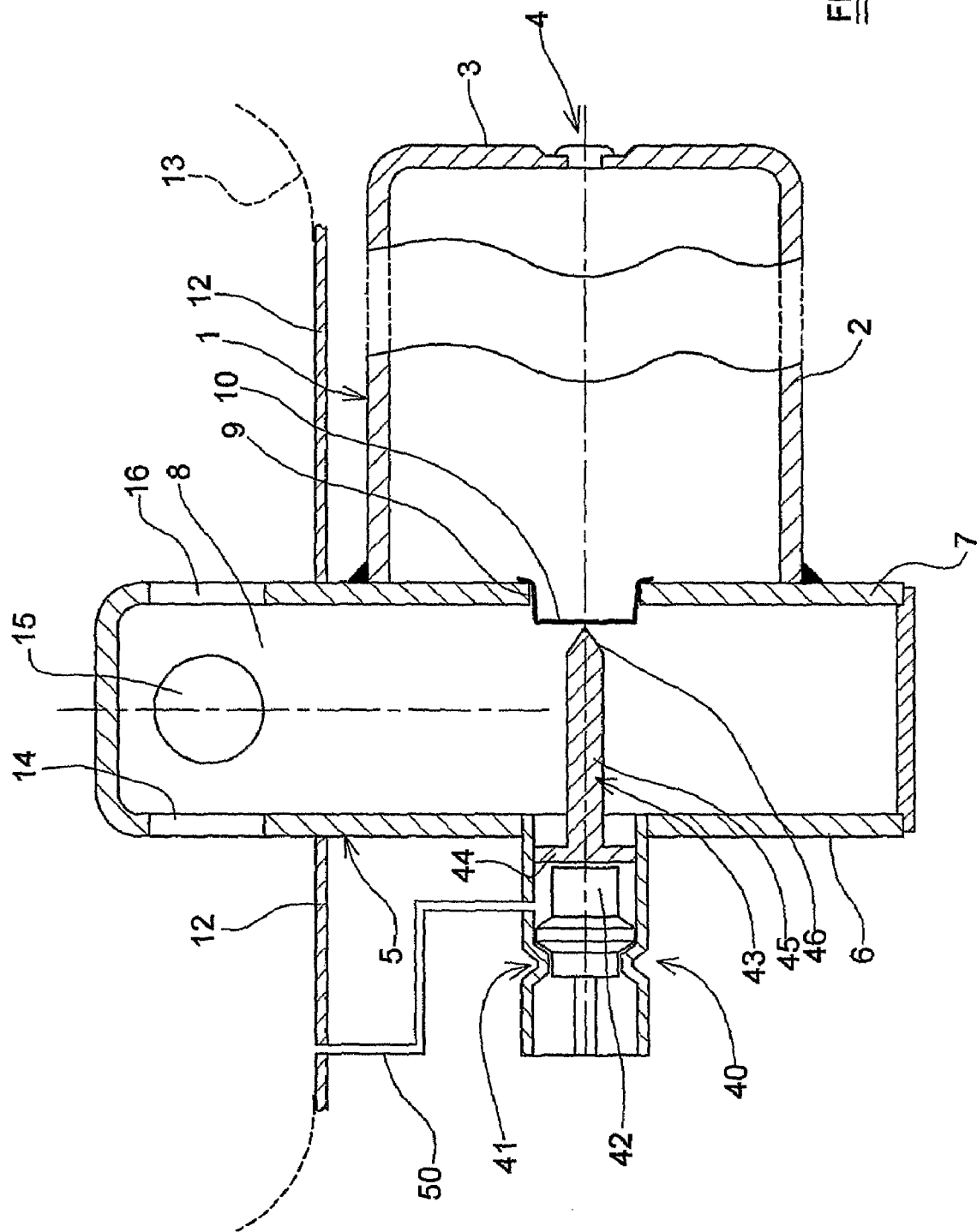

In order that the invention may be more readily understood, and so that further features thereof may be appreciated, the invention will now be described, by way of example, with reference to the accompanying drawings in which:

FIG. 1 is a diagrammatic view of part of a gas generator and air-bag combination, illustrating the gas generator in a first condition, FIG. 2 is a view corresponding to FIG. 1 illustrating the gas generator in a second condition, FIG. 3 is a partial view corresponding to FIG. 1 illustrating the gas generator in a further condition, FIG. 4 is a view corresponding to FIG. 3 showing an alternative form of inflator, and FIG. 5 is a view corresponding to FIG. 4 showing a further alternative form of inflator.

Referring initially to FIG. 1 of the accompanying drawings, an inflator comprises a gas bottle 1 (part of which is shown in phantom), the gas bottle 1 having a side-wall 2 and a base 3, the base 3 being provided with a filling aperture 4. An open end of the gas bottle 1 is secured to a housing 5. The housing has two spaced-apart vertical planar walls 6, 7, which define between them a chamber 8, the chamber 8 being sealed by end walls one of which is not shown in the sections illustrated. Formed in the central part of the side-wall 7 is an aperture 9, the aperture 9 being sealed by a foil 10.

The gas bottle 1 is secured to the side-wall 7 of the housing 5 in such a way that the interior of the gas bottle communicates with the opening 9, the gas bottle thus effectively being closed and sealed by the metal foil 10.

The housing 5 is connected, at a point above the gas bottle 1, to a flange 12, the flange 12 forming part of a housing containing an air-bag 13. The upper part of the housing 5 thus extends into the interior of the air-bag 13. The upper part of the housing is provided with four gas outlet apertures, only three of which can be seen in FIG. 1, namely a first aperture 14 formed in the side-wall 6, a second aperture 15 formed in one end wall and a third aperture 16 formed in the other side-wall 7.

Mounted in the chamber 8 between the side-walls 6 and 7 is an arrangement to open the gas bottle 1, with the arrangement including a squib unit 17. The squib unit 17 comprises a pyrotechnic squib 18 which is mounted within a tubular support 19. The tubular support 19 extends upwardly above the squib, thus defining a circular cross-section chamber. The upper part of the tubular support 19 supports a "U"-shaped bracket 20, the bracket 20 having (in the orientation shown) a horizontal base 21 and two upstanding planar arms 22, 23 which extend perpendicularly from the base. The upstanding arm 23 in the embodiment illustrated, is provided with a line of mechanical weakness 24, at a position where the arm is connected to the base 21. The bracket 20 may be formed from a planar metal strip which is bent or folded to have the appropriate form, or may be moulded of a plastics material. An aperture 24' is provided in the central part of the base 21, the aperture being located above (in the orientation shown) the pyrotechnic squib 18. Part of a piston element 25 extends through the aperture 24' as will be described.

The piston element 25 is provided with a piston head 26 received within the circular cross-section chamber defined above the squib 18 by the tubular support 19. The piston includes a piston rod 27 which extends, from the piston head 26, upwardly through the aperture 24', and the upper end of the piston rod 27 carries two outwardly directed support flanges 28, 29, which extend outwardly and which, in the initial position of the components as illustrated, directly engage the upper-most ends of the arms 23, 24 of the bracket 20.

The arm 23 of the bracket 20 lies immediately adjacent the foil 10 that is effectively sealing the gas bottle 1 and the arm 23 acts as a support member to support the foil. Thus the arm 23 prevents the foil from rupturing.

Mounted on part of the flange is an igniter 30. The igniter 30 is provided with two electrodes 31 which are spaced-apart, and is also provided with a signal generator 32 to generate an electric signal which will pass between the electrodes 31 as a spark.

The gas bottle contains a mixture of gases. One gas is an oxidiser gas or fuel gas, and may be hydrogen, methane, ethane, propane or butane or a mixture of one or more such gases. The gas mixture also includes an oxidising gas such as oxygen, or nitrogen dioxide. The oxygen may be provided simply by introducing air, in the form of compressed air, into the bottle. The mixture of gases within the bottle preferably also include at least one inert gas such as helium, argon, nitrogen or mixtures thereof. The pressure of gas within the vessel may be such that the gas is in partly liquidised form.

When the air-bag is to be inflated, the squib 18 will be actuated. Gas generated by the squib will apply a force to the piston head 26, moving the piston 25 upwardly. The piston 25 thus moves to a position in which the piston head 26 engages the under-surface of the base 21 of the bracket 20. In this position the outwardly directed flanges 28, 29 have been moved upwardly above the upper ends of the arms 22, 23 of the bracket. The arm 23 of the bracket is thus no longer supported at its upper end. This enables the arm 23 to pivot inwardly, about the line of mechanical weakness 24, in response to pressure applied to the arm 23 by the foil 10, thus removing the support applied to the foil 10. The foil 10 thus ruptures.

As shown by arrows in FIG. 2 the gas mixture from the gas bottle 1 will thus flow through the now open aperture 9, past the outwardly directed flanges 28, 29 of the piston 25 and out through the gas flow apertures 14, 15, 16 and into the interior of the air-bag. As the gas mixture flows, into the air-bag, so the air-bag commences inflation. At a selected instant after commencement of inflation, when the gas mixture has at least partially inflated the air-bag, the signal generator 32 generates a signal, and the signal passes, as a spark, between the electrodes 31, to ignite the gas mixture within the air-bag. The oxidisable gas of the gas mixture is thus oxidised, substantially increasing the temperature of the gas mixture, and thus increasing the pressure of gas within the inflating air-bag.

Should the pressure of gas within the bottle 1 rise to an unacceptable level, for example as a consequence of a vehicle fire, the line of mechanical weakness 24 may break, and the arm 23 of the bracket 20 will move away from the foil 10, thus enabling the foil 10 to rupture and to permit gas to escape from the bottle 1, thus obviating the risk of the bottle 1 exploding. This is illustrated in FIG. 3.

Alternatively the arm 23 may be provided with a central region surrounded by a line of mechanical weakness. If the foil applies a high pressure to the arm 23 the central region will be displaced, with the line of weakness breaking, and the foil 10 will then rupture. It is to be appreciated that in the described embodiment of the invention the spark igniter arrangement which incorporates electrodes 31 is located within the air-bag, at a substantial distance from the gas bottle 1. Because the spark igniter is located at a substantial distance from the gas bottle there is a minimal risk of premature ignition of the gases within the gas bottle caused, for example, by static electricity.

FIG. 4 illustrates a modified embodiment of the invention in which a different opening arrangement is provided to open the gas bottle. In the embodiment of FIG. 4 the gas bottle 1, and the housing 5 have the same design as in the embodiment of FIG. 1. Also the flange 12 and the spark generating arrangement 30 are the same as previously described. However, in the embodiment of FIG. 4, the foil 10 sealing the aperture 9 is a self-supporting foil, thus being somewhat thicker than the foil of the embodiment described with reference to FIGS. 1 to 3. The housing 5 is modified in that the housing 5 is provided with a gas bottle opening arrangement having a squib unit 40 which is mounted to the side-wall 6 of the housing at a position directly opposite the aperture 10. The squib unit 40 includes a generally cylindrical housing 41 which contains a pyrotechnic squib 42. The housing 41 communicates with the interior of the chamber 8 of the housing 5. Mounted within the housing 41 is a piston 43, the piston 43 having a piston head 44 located within the housing 1 at a position initially adjacent the pyrotechnic squib 42 and having a shaft 45 which has a pointed end 46, the shaft 45 extending across the chamber 8 within the housing 5 so that the pointed end 46 of the shaft 45 is located adjacent the foil 10.

In the event that an accident should occur, the pyrotechnic squib 42 is activated thus moving the piston 43 to the right as shown in FIG. 4, so that the pointed end 46 of the shaft 45 penetrates and ruptures the foil 10. When the foil 10 has been ruptured gas from inside the bottle 1 will flow into the chamber 8 within the housing 5 and thus through the gas outlet apertures 14, 15, 16 into the interior of the air-bag 13. When the gas has partially inflated the air-bag 13 a signal will be generated by the signal generator 32, thus generating a spark which passes between the electrodes 31, which will ignite the gas within the partially inflated air-bag. The oxidisable gas is oxidised and the temperature of gas within the air-bag thus rises substantially increasing the pressure of gas within the air-bag.

In the described embodiments of the invention the initiating device is a spark igniter and the initiating device is actually located within the air-bag. However, in other embodiments of the invention different types of initiating device may be utilised. For example, it is envisaged that it will be possible to utilise an initiating device in the form of a pyrotechnic unit or pyrotechnic squib. Such a pyrotechnic unit or pyrotechnic squib generates a flame when activated. It is therefore contemplated that a conduit may be provided extending from such a squib to a point within the air-bag so that, as the gas mixture inflates the air-bag, when the air-bag is partially inflated a flame from the pyrotechnic unit may pass through the conduit and thus ignite the gas which is within the air-bag.

Whilst a separate squib could be provided, actuated by a signal from a signal generator equivalent to the signal generator 32, so that the squib is actually actuated a predetermined period of time after deployment of the air-bag has commenced, in one specific embodiment of the invention, as shown in FIG. 4, a pyrotechnic unit is utilised as part of the initiating device which is incorporated into the arrangement provided to open the gas bottle.

FIG. 5 corresponds substantially with FIG. 4, and consequently the embodiment of FIG. 5 will not be re-described in detail. However, it is to be observed that, in FIG. 5, a conduit 50 is provided which extends from the housing 41 which contains the pyrotechnic squib 42, to the flange 12, the conduit 50 thus forming a communication between the pyrotechnic squib 42 and the interior of the air-bag.

In the event that an accident should occur the pyrotechnic squib unit 42 is actuated, generating flame and hot gas. The gas moves the piston to the right as shown in FIG. 5 so that the pointed end of the shaft penetrates and ruptures the foil 10. When the foil 10 has been ruptured gas from inside the bottle 1 will flow into the chamber 8 within the housing 5 and thus through the gas outlet apertures 14, 15, 16 into the interior of the air-bag. The air-bag, when initially folded, may effectively close the end of the conduit 50 located within the flange 12. However, as the air-bag commences inflation, full communication is established between the pyrotechnic squib 42 and the interior of the air-bag through the conduit 50. Flame from the pyrotechnic unit 42, which does burn for a sufficiently long period of time, effectively flows through the conduit 50 to ignite the gas mixture within the air-bag. The oxidisable gas is oxidised and the temperature of the gas within the air-bag thus rises, substantially increasing the pressure of gas within the air-bag.

In embodiments of the invention the gas mixture is only ignited at a point remote from the gas bottle containing the gas mixture. The gas mixture is only ignited when it is already within the air-bag having flown through the housing 8 and also having passed through the gas outlet apertures 14, 15, 16. The risk of the flame of the igniting gas "burning back" to gas within the gas bottle 1 is thus minimised.

When used in this Specification and Claims, the terms "comprises" and "comprising" and variations thereof mean that the specified features, steps or integers are included. The terms are not to be interpreted to exclude the presence of other features, steps or components.

The invention claimed is:

1. An inflator for an air-bag, comprising:
    a single gas bottle containing a pressurised gas mixture, the pressurised gas mixture including at least an oxidisable gas and an oxidising gas;
    an arrangement to open the gas bottle to enable the gas mixture to flow from the gas bottle to an interior of the air-bag; and
    an initiating device to ignite the gas mixture after the gas mixture flows from the gas bottle to the interior of the air-bag, the initiating device being positioned remote from the gas bottle and arranged to ignite the gas mixture that has flowed into the interior of the air-bag;
    wherein the initiating device includes a pyrotechnic unit mounted externally of the air-bag and a conduit to lead flame from the pyrotechnic unit to the interior of the air-bag.

2. The inflator of claim 1, further comprising a signal generator to generate a signal when the gas mixture from the gas bottle has flowed into the interior of the air-bag, the initiating device being actuated in response to the signal.

3. The inflator of claim 2, wherein the initiating device is a spark igniter.

4. The inflator of claim 1, wherein the initiating device is located within the air-bag.

5. The inflator of claim 1, wherein the pyrotechnic unit forms part of the arrangement provided to open the gas bottle.

6. The inflator of claim 1, wherein the gas bottle is initially sealed by a rupturable foil and the opening arrangement is operative to cause rupturing of the foil.

7. The inflator of claim 1, wherein the opening mechanism incorporates a piston, the piston being associated with a squib to drive the piston from a first position to a second position, the piston having a shaft, the shaft initially being located adjacent the foil, with the piston being positioned such that as the piston moves to the second position the foil will rupture.

8. The inflator of claim 1, wherein the oxidisable gas includes at least one of hydrogen, methane, propane, butane and mixtures thereof.

9. The inflator of claim 1, wherein the oxidising gas includes at least one of oxygen and nitrogen dioxide.

10. The inflator of claim 1, wherein the gas mixture in the gas bottle contains air.

11. The inflator of claim 1, wherein the gas mixture in the gas bottle includes an inert gas.

12. The inflator of claim 11, wherein the inert gas is selected from the group including helium, argon, nitrogen and mixtures thereof.

13. The inflator of claim 1, in combination with the air-bag.

14. The inflator of claim 1, wherein the conduit is positioned remote from the gas bottle.

15. The inflator of claim 14, wherein the conduit directly couples the pyrotechnic unit to the air-bag so as to lead flame directly from the pyrotechnic unit to the interior of the air-bag.

16. An inflator for an air-bag, comprising:
a single gas bottle containing a pressurised gas mixture, the pressurised gas mixture including at least an oxidisable gas and an oxidising gas;
an arrangement to open the gas bottle to enable the gas mixture to flow from the gas bottle to an interior of the air-bag; and
an initiating device to ignite the gas mixture after the gas mixture flows from the gas bottle to the interior of the air-bag, the initiating device being positioned remote from the gas bottle and arranged to ignite the gas mixture that has flowed into the interior of the air-bag,
wherein the gas bottle is initially sealed by a rupturable foil and the opening arrangement is operative to cause rupturing of the foil, and
wherein the opening arrangement includes a support member mounted in a position to support the foil in an unruptured state, the support member being retained in the position by part of a piston element which, in an initial position, directly engages the support member, the piston element being associated with a squib to drive the piston element relative to the support member from the initial position to a release position in which the piston element no longer engages the support member thereby permitting the support member to move to another position in which the foil will rupture to permit the gas mixture to escape from the gas bottle.

17. The inflator of claim 16, wherein the support member is formed as part of a bracket in the form of a support arm which extends substantially perpendicularly from a base.

18. The inflator of claim 17, wherein the piston element includes a longitudinally extending piston rod having a piston head positioned at one end of the rod and a support flange positioned at an opposite end of the rod as the piston head, the support flange extending transversely from the piston rod and directly engaging the support arm, the piston rod extending through an aperture in the base such that the support flange is disposed on one side of the base and the piston head is disposed on an opposite side of the base as the support flange and adjacent the squib, and the piston rod being moveable relative to the base.

19. The inflator of claim 16, wherein the support member is yieldable and is configured to yield in response to the pressure of the gas in the bottle exceeding a predetermined threshold, thus permitting the foil to rupture.

20. The inflator of claim 19, wherein the support member has a line of mechanical weakness such that the line of mechanical weakness will break and at least part of the support member will yield when gas pressure in the gas bottle exceeds the predetermined threshold thus permitting the foil to rupture.

* * * * *